Feb. 14, 1961 L. HENZIROHS 2,971,649
JUICE EXTRACTOR
Filed Nov. 20, 1957 2 Sheets-Sheet 1

Inventor:
Leo Henzirohs
by:
Michael S. Striker
Attorney

Feb. 14, 1961  L. HENZIROHS  2,971,649
JUICE EXTRACTOR
Filed Nov. 20, 1957  2 Sheets-Sheet 2

Inventor:
Leo Henzirohs
by:
Michael S. Striker
Attorney

United States Patent Office 2,971,649
Patented Feb. 14, 1961

2,971,649

JUICE EXTRACTOR

Leo Henzirohs, Oberbuchsiten, Switzerland, assignor to JURA Elektroapparate-Fabriken L. Henzirohs A.G., Niederbuchsiten, Switzerland Filed Nov. 20, 1957, Ser. No. 697,698

Claims priority, application Switzerland Oct. 25, 1957

3 Claims. (Cl. 210—369)

My present invention relates to improvements in juice extractors comprising a rotor rotatable about a stationary axis, the intermediate rotor portion being adapted for finely shredding fruit and vegetable, and said rotor having on its periphery a strainer which in longitudinal section is inclined with respect to said axis, for centrifuging the juice and continually removing the spent fruit or vegetable particles.

Juice extractors of this type and construction are known. It has been found that a good yield of juice only is attainable when the strainer has a slight taper, but that in such case the residue quickly accumulates instead of moving away.

The present invention aims to remedy said accumulation of residue by providing the rotor with a bottom and an annular member which together form an annular duct through which the spent solid particles pass on their way to the strainer, and further by making an annular gap disposed between the rim of the annular member and the strainer edge which rises with a slight taper beyond the level of the annular member, not substantially wider than the spacing between rotor bottom and annular member.

Two forms of the invention are shown, by way of example, in the drawing, in which—

Figure 1:
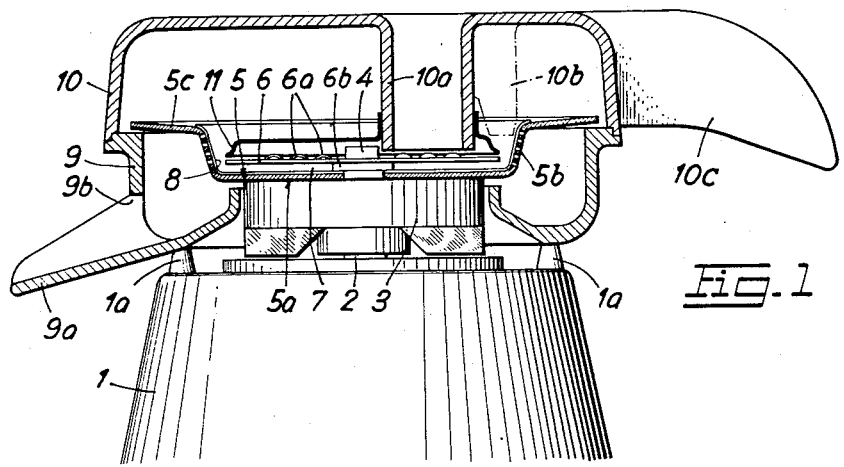
Fig. 1 is a plan view of the first form, partly in vertical section.
Figure 2:
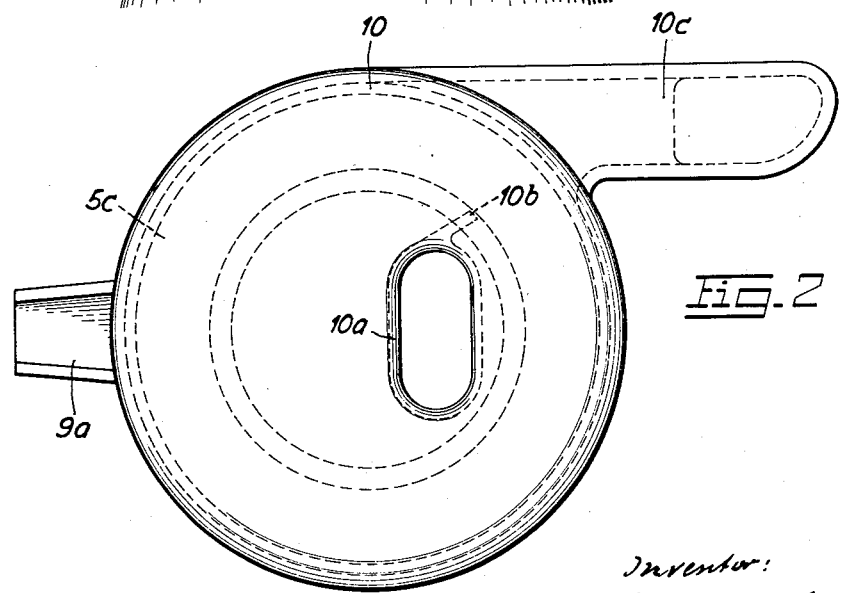
Fig. 2 is an appurtenant top plan view.

In the base 1 is incorporated an electric motor to the shaft 2 of which is fixed a ventilator wheel 3 for cooling the motor. To the upper side of wheel 3 are secured, by means of a screw 4, a rotor member 5 shaped like a soup-plate and a cutting disc 6. The latter on its upper side is provided with a plurality of cutting bosses 6a below each of which is disposed an aperture through which the shredded goods pass into the gap 7 between cutting disc 6 and the flat bottom 5a of member 5 of which the wall 5b is perforated. A fine-mesh strainer 8 is inserted into plate 5 and clamped thereto by means of screw 4 and the boss 6b of cutting disc 6. The rim portion 5c of rotor member 5 forms a centrifuging disc.

On studs 1a of base 1 is secured a housing portion 9 which on its bottom provides an internal juice-collecting annular duct with a lateral aperture 9b terminating in a spout 9a. On housing portion 9 is detachably mounted a cap 10 which comprises a hollow lug 10a for introducing the goods (fruit or vegetable) to be shredded and centrifuged. On to said lug is plugged a disc 11 which prevents cut-off particles from being flung upwardly. Cap 10 further comprises a stripper 10b adjoining lug 10a. The interior space of the housing formed by the members 9, 10 is divided into two superposed parts by disc 5c which rotates about a vertical axis. The upper one of said two parts opens (not shown) into an outlet gutter 10c for the centrifuged solid particles.

In operation, the solid particles arriving in gap 7 are flung outwardly and are retained by sieve 8. When goods are continually fed through inlet 10a, the solid particles centrifuged last push the previously centrifuged particles away upwardly on the strainer. During such upward travel, the particles are thoroughly centrifuged and then pass on to rim 5c. The rotary members 5, 6 also act as blower so that there is an airflow in the interior of cap 10, and air is discharged together with the centrifuged pulp through gutter 10c.

Figure 3:
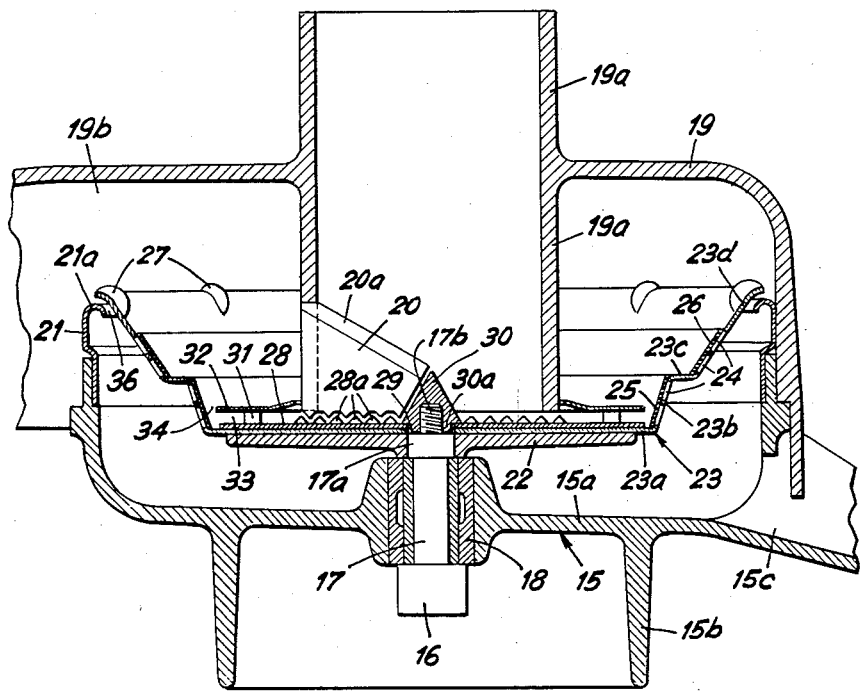
Fig. 3 shows a vertical section through the second form.

In Fig. 3 which illustrates the second form of the invention, the base in which is housed the electric motor, has been omitted. The slightly sloping bottom 15a of a housing portion 15 which serves a juice collector, is provided on its underside with an annular lug 15b which has a slight inside taper and which serves for plugging said housing portion on to the base, as is known in prior constructions. In such plug connection, a coupling member 16 fixed to the lower end of an axle 17 is engaged to another coupling member (not shown) fixed to the upper end of the vertical motor shaft (not shown). Axle 17 is rotatably and axially immovable mounted, in a conventional way and manner, in a plain bearing 18 located in the bottom 15a of housing portion 15. On the latter, which comprises a lateral juice spout 15c, is detachably mounted a cap 19 which has a central funnel 19a for introducing the goods to be shredded and centrifuged. In the lower end portion of said funnel is inserted a thin radial steel rib 20 for the purpose of preventing the goods introduced from rotating. The upper downwardly inclined edge 20a of rib 20 is sharpened to form a knife edge. Cap 19 on one side has a spout 19b for throwing off the centrifuged pulp. Housing portion 15 has firmly inserted on top a metallic ring 21 of which the upper rim 21a is bent inwardly.

On a shoulder 17a of shaft 17 is detachably mounted a rotary disc 22 made, for example, of brass to which is brazed the flat bottom 23a of a centrifuge basket 23 also made of brass. The latter is upwardly flared conically in two steps. The lower basket portion 23b, which directly joins bottom 23a and is provided with two superposed series of relatively large-sized openings 24, has a slighter taper than the upper basket portion 23d which is connected thereto through a level annular wall portion 23c and which also is provided with two superposed series of relatively large-sized openings 24. To the inside of each of said basket portions 23b, 23d is brazed a corresponding conical fine-mesh strainer 25 and 26 respectively. The upper rim of the strainer basket, which is separated from the top edge 21a of ring 21 by an annular gap 36 only, is slightly arched outwardly and is provided on the inside with centrifuging ribs 27.

On the flat strainer-basket bottom 23a which forms the rotor bottom, is set a flat disc 28 which in conventional manner is provided with cutting teeth 28a arranged in concentric circles and bent upwardly from the material of said bottom. Disc 28 in the center has a non-round, for example square hole 29. The shape of the latter matches the exterior form of a lower shoulder 30a of a cap nut 30 which is screwed on to a threaded stud portion 17b of shaft 17 and is conically tapered upwardly. The central hole of the strainer-basket bottom 23a is round. Cap nut 30 may be tightened and slackened, without need of a tool, by turning disc 28 with respect to the strainer basket, since disc 28 through the wall of its square hole turns with it the square shoulder 30a of cap nut 30.

To disc 28 are riveted, arranged in an exterior circle concentric to shaft 17, studs 31 which also are riveted to an annular disc 32 coaxial to shaft 17. Disc 32 is slightly conical at the center and otherwise flat, and smooth at least on its underside. Disc 32, together with the subjacent smooth portion of the rotor bottom formed by disc 28, forms a flat annular duct 33 through which passes the pulp on its way to the strainer. Between the exterior rim of disc 32 and the strainer, which latter adjoins the edge of the strainer-basket bottom 23a and rises with a slight taper above the level of disc 32, is situated an annular gap 34 which is not substantially wider than the distance between rotor bottom 28 and disc 32. In this way I attain that pulp flung outwardly through annular gap 33, push away the particles clinging to the slightly tapered strainer 25, until the latter particles in the range of the flat strainer section 23c are again flung outwardly and bounce on the strainer section 23d and strainer 26 respectively. Since section 23d and strainer 26 have a greater conicity, the pulp readily travels thereon upwardly without accumulating, as otherwise would be the case on the lower strainer section 25 in the absence of the displacement effect.

The centrifuged juice accumulates on bottom 15a of housing portion 15. The inwardly bent upper rim 21a of ring 21 prevents juice from spilling over into the interior space of cap 19 situated above the strainer basket.

Figure 4:
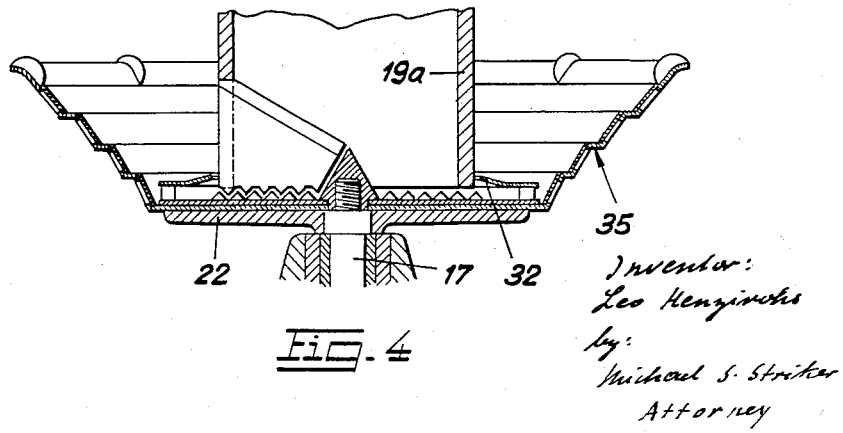
Fig. 4 depicts in section a multi-stage centrifuging basket.

The rotor modification shown in Fig. 4 only differs from the embodiment described above in that it comprises four conical steps and three intermediate flat annular sections.

What I claim is:

1. In a juice extractor, a rotary strainer basket having a bottom wall portion and an annular perforated side wall portion connected to and extending upwardly from the outer periphery of said bottom wall portion and said annular side wall portion being too steep to advance material by centrifugal force upwardly along said side wall portion during rotation of the strainer basket; and means comprising an annular member having a lower substantially flat surface and being operatively connected to said bottom wall portion, spaced thereabove and from said side wall portion, cooperating with said bottom wall portion and said side wall portion for feeding material upwardly along said side wall portion during rotation of the basket.

2. In a juice extractor as recited in claim 1, the distance between said bottom wall portion and annular member thereover being at least substantially as great as the distance between the periphery of said annular member and said side wall portion so that material moving outwardly beyond said annular member along said bottom wall portion to said side wall portion will advance material engaged by said side wall portion upwardly along the latter through the gap between the outer periphery of said annular member and said side wall portion.

3. In a juice extractor as recited in claim 1, a second annular perforated side wall portion coaxial with said first-mentioned side wall portion and higher than and of a greater diameter than the same, said second side wall portion having a lower edge substantially at the elevation of the upper edge of said first-mentioned side wall portion and said basket having an annular wall portion fixed to and extending from the upper edge of said first-mentioned side wall portion to the lower edge of said second side wall portion so that during rotation of the basket material moving upwardly beyond the upper edge of said first-mentioned side wall portion will be thrown centrifugally along said annular wall portion forcefully into engagement with said second side wall portion, the latter being less steep than said first-mentioned side wall portion and the material advancing upwardly along said second side wall portion by centrifugal force during rotation of the basket.

References Cited in the file of this patent

UNITED STATES PATENTS

| 1,569,778 | Murphy | Jan. 12, 1926 |
| 1,886,092 | Graham | Nov. 1, 1932 |
| 2,297,880 | Fredrickson | Oct. 6, 1942 |
| 2,305,193 | Reynolds et al. | Dec. 15, 1942 |
| 2,343,327 | Reynolds | Mar. 7, 1944 |
| 2,351,330 | Goetz | June 13, 1944 |

FOREIGN PATENTS

| 279,578 | Switzerland | Mar. 17, 1952 |